United States Patent

Sakai et al.

[11] Patent Number: 5,916,058
[45] Date of Patent: Jun. 29, 1999

[54] ANTI-CREEP CONTROL APPARATUS OF AUTOMATIC TRANSMISSION

[75] Inventors: Hiromasa Sakai, Kanagawa; Takashi Murasugi, Shizuoka; Motoharu Nishio, Yokohama, all of Japan

[73] Assignee: Nissan Motor Co., Ltd., Yokohama, Japan

[21] Appl. No.: 08/898,685

[22] Filed: Jul. 22, 1997

[30] Foreign Application Priority Data

Jul. 24, 1996 [JP] Japan ................................ 8-194639

[51] Int. Cl.⁶ .............................. F16H 61/20; F16H 47/06
[52] U.S. Cl. ............................................................. 477/114
[58] Field of Search .................................... 477/114, 107, 477/110, 143

[56] References Cited

U.S. PATENT DOCUMENTS 4,730,708  3/1988  Hamano et al. ................. 477/169 X
4,775,938  10/1988  Hiramatsu ......................... 364/424
4,803,901  2/1989  Hamano et al. ................ 477/114 X
4,898,049  2/1990  Niikura ................................. 74/866
5,586,954  12/1996  Iwata et al. .................... 477/114 X

FOREIGN PATENT DOCUMENTS 5-157173  6/1993  Japan.

Primary Examiner—Khoi Q. Ta
Attorney, Agent, or Firm—Foley & Lardner

[57] ABSTRACT

An anti-creep control apparatus of an automatic transmission has a forward clutch control section which controls the hydraulic pressure of a forward clutch by slipping the forward clutch when the automatic transmission is set in a drive range and the vehicle is stopped while an engine is operating. The anti-creep control apparatus controls an hydraulic pressure of the forward clutch to be held or increased by a predetermined value when a relative rotation of the forward clutch is detected during the anti-creep control. The controlled hydraulic pressure is set as a lower limit value of the forward clutch hydraulic pressure in a present anti-creep control.

5 Claims, 13 Drawing Sheets

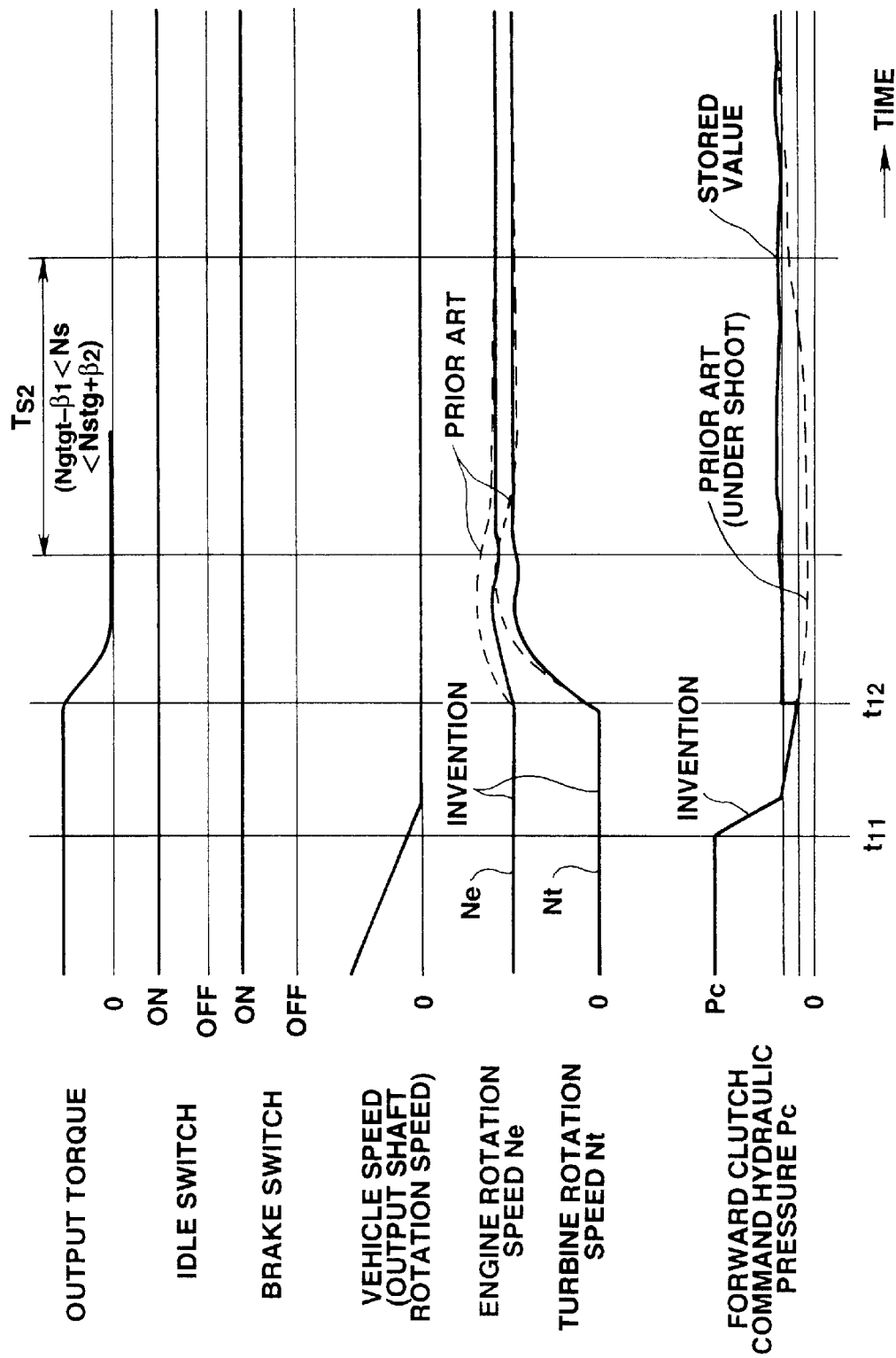

ANTI-CREEP CONTROL APPARATUS OF AUTOMATIC TRANSMISSION

BACKGROUND OF THE INVENTION

The present invention relates to improvements in an anti-creep control apparatus of an automatic transmission of a vehicle.

Various anti-creep control apparatus of an automatic transmission have been proposed in order to decrease vehicle body vibration and energy consumption during idling of the vehicle and to prevent a so-called creep phenomenon that the vehicle is moved forward inch by inch without acceleration of the engine when the automatic transmission is put in a drive range. Japanese Patent Provisional Publication No. 5-157173 discloses a typical anti-creep control apparatus of an automatic transmission which apparatus is arranged to quickly engage a forward clutch if a driver intends to quickly start the vehicle and to slowly engage the forward clutch so as to decrease a shock in the clutch releasing operation if a driver does not intend to quickly start the vehicle.

However, when a command hydraulic pressure of the forward clutch is decreased in accordance with the start of the anti-creep control of this conventional anti-creep control apparatus, the command hydraulic pressure is put in an undershoot condition as shown by a dotted line of FIG. 6 because of a time delay of the increase of the torque converter output rotation speed and of the hysteresis in characteristics between the hydraulic pressure and a piston stroke. If a driver tries to quickly start the vehicle by depressing an acceleration pedal during this undershoot of the forward clutch hydraulic pressure, the engagement of the forward clutch is delayed by the degradation of the responsibility of the increase of the forward clutch hydraulic pressure. This invites a racing of an engine of the vehicle and a shock by the engagement of the forward clutch thereafter.

SUMMARY OF THE INVENTION

It is an object of the present invention to provide an improved anti-creep control apparatus which executes a smooth engagement of a forward clutch of an automatic transmission without generating an engine racing and an engagement shock, even by a quick start of a vehicle during an anti-creep control.

According to the present invention, an anti-creep control apparatus of an automatic transmission executes an anti-creep control by slipping a friction element which is operating when the automatic transmission is set in a drive range. The anti-creep control apparatus comprises a relative rotation detecting means for detecting a generation of a relative rotation of the friction element, and a pressure control means for increasing a friction element command hydraulic pressure of the time of the generation of the relative rotation by a predetermined value. The increased friction element command hydraulic pressure is set as a lower limit value of the friction element command hydraulic pressure during a present anti-creep control.

BRIEF DESCRIPTION OF THE DRAWINGS

FIG. 14 is a time chart for explaining the manner of operation of the sixth embodiment.

DETAILED DESCRIPTION OF THE INVENTION

Figure 1:
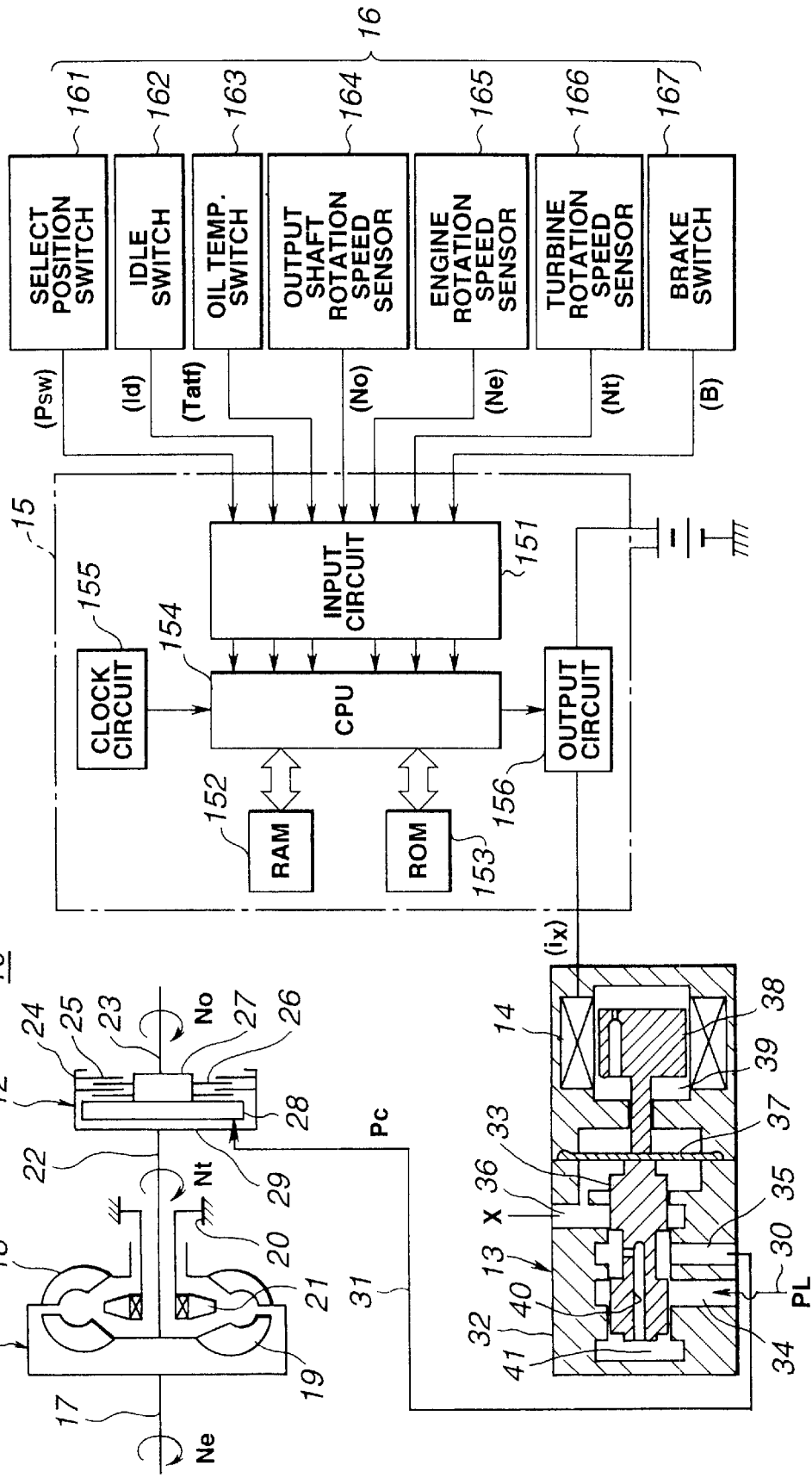
FIG. 1 is a schematic structural view which shows a first embodiment of an anti-creep control apparatus of an automatic transmission in accordance with the present invention.

Referring to FIGS. 1 to 7, there is shown a first embodiment of an anti-creep control apparatus 10 of an automatic transmission for a vehicle.

The anti-creep control apparatus 10 of the automatic transmission is arranged to execute an anti-creep control by controlling a hydraulic pressure of a forward clutch (start clutch) 12.

The anti-creep control apparatus 10 comprises a torque converter 11, the forward clutch 12, an oil pressure modulator 13, a solenoid (actuator) 14, a control unit 15, and an input sensor unit 16.

The torque converter 11 is of a hydraulic power transmission device which transmits a rotational drive force of an engine (not shown) to wheels of the vehicle by an amplifying function thereof until the rotation speed of the engine reaches a predetermined rotation speed. The torque converter 11 is constituted by a pump impeller 19 which is connected with a drive input shaft 17 receiving the rotational drive force of the engine, a turbine runner 19 to which the drive force from the pump impeller 18 is transmitted through fluid, and a stator 21 which is fixed to a transmission case 20 through a not-shown one-way clutch. The turbine runner 19 is connected with a drive force output shaft 22.

The forward clutch 12 is one of friction elements for a gear train including a planetary gear unit of the automatic transmission. The forward clutch 12 is a wet type multi-plate clutch which is held in the engaged condition when the automatic transmission is set in a drive shift position. The forward clutch 12 is constituted by a clutch drum 24 which is connected with a drive output shaft (transmission input shaft) 22, clutch plates 25 which are disposed in and splined to the clutch drum 24, clutch plates 26 which are alternatively arranged with the clutch plates 25, a clutch hub 27 in which the clutch plates 27 are splinedly disposed, a clutch piston 28 installed to the clutch hub 27, and a piston chamber 29 to which controlled hydraulic pressure (forward clutch hydraulic pressure) Pc for operating the clutch piston 28 is supplied. The clutch hub 27 is interconnected with a transmission output shaft 23 through a gear train (not shown).

The oil pressure modulator (OPM) 13 is disposed in a line pressure passage 30 for supplying a line pressure $P_L$ generated by controlling the discharged pressure of an oil pump (not shown) by means of a pressure regulator valve (not shown). The OPM 13 is connected with the piston chamber 29 of the forward clutch 12 through the hydraulic passage 31. The OPM 13 is an electromagnetic solenoid valve of a proportional type in which a spring force of a pressure reducing valve is replaced by the electromagnetic force of the solenoid 14 and increases the output port pressure according to an OPM electric current ix applied to the solenoid 14 so as to perform the characteristics shown in FIG. 5. The OPM 13 comprises a valve body 32 in which a spool 33, a control pressure input port 34, a control pressure output port 35, a drain port 36, a diaphragm 37, a spool operation piston 38, an air chamber 39, a communication passage 40, a pressure oil chamber 41 and a solenoid 14 are disposed. The OPM 13 is arranged such that the spool 33 is moved at a position where the electromagnetic force of the solenoid 14 (a force pushing the spool 33 to the left hand side in FIG. 1) is balanced with the hydraulic pressure force (a force pushing the spool 33 to the right hand side in FIG. 1).

The control unit 15 is a microcomputer which includes an input circuit 151, RAM (random access memory) 152, ROM (read only memory) 153, CPU (central processing unit) 154, a clock circuit 155, and an output circuit 156. The input circuit 151 converts input signals from sensors of the sensor unit 16 into digital signals so as to be able to be processed by the CPU 154. The converted digital signals are sent from the input circuit 151 to the CPU 154. The RAM 152 is a random access memory from and in which information such as the input signals of the sensors and the calculated data is read and written by the CPU 154. The ROM 153 previously stores information necessary for the processing in the CPU 154 and is accessed with the CPU 154 according to the demand from the CPU 154. The CPU 154 executes a calculation process according to the predetermined processing condition of the various input information. The CPU 154 executes the processing of the input information in the anti-creep control and the forward clutch control. The clock circuit 155 sets the operation time of the CPU 154. The output circuit 156 outputs a control current signal ix to the solenoid 14 according to the calculated signal from the CPU 154.

The input sensor unit 16 includes a select position sensor 161, an idle switch 162, an oil temperature sensor 163, an output shaft rotation-speed sensor (an output shaft rotation-speed detecting means which may be replaced by a vehicle speed sensor) 164, an engine rotation speed sensor (engine rotation-speed detecting means) 165, a turbine rotation-speed sensor 166, and a brake switch 167.

The select position sensor 161 outputs a switch signal indicative of a selected range of the automatic transmission (a select position). More particularly, when the selected range is a neutral range (N-range), the select position switch 161 is turned ON. Only when the selected range is a drive range (D-range), the select position switch 161 is turned OFF and outputs the switch signal $P_{SW}$ to the input circuit 151. The switch signal $P_{SW}$ outputted from the select position switch 161 indicates that the selected shift range of the automatic transmission is changed from N-range to D-range (N→D). The switch signal $P_{SW}$ is used as a signal for deciding a start time of the supply of the line pressure. The idle switch 162 detects as to whether a throttle valve of the engine is fully closed or not, that is, whether the engine is put in an idle condition or not. When the throttle valve is open, the idle switch 162 is turned OFF. Only when the throttle valve is put in a full close condition, the idle switch 162 is turned ON and outputs a switch signal Id. Since the idle switch 162 is turned OFF when the throttle opening degree of the engine is greater than a predetermined value, the idle switch 162 functions as an engine output detecting means. It will be understood that the idle switch 162 may be replaced by a throttle sensor. The oil temperature sensor 163 detects temperature of the automatic transmission fluid (ATF temperature) and outputs an oil temperature signal $T_{atf}$. The output shaft rotation speed sensor 164 detects an output shaft rotation speed No of the automatic transmission output shaft 23. The signal No outputted from the output shaft rotation speed sensor 164 is used as a signal indicative of a vehicle speed. The engine rotation-speed sensor 165 detects a rotation speed (engine rotation speed) Ne of the drive-force output shaft 17 and outputs an engine rotation speed signal Ne. The turbine rotation-speed sensor 166 detects a rotation speed (turbine rotation speed) Nt of the drive output shaft 22 and outputs a turbine rotation-speed signal Nt. The control unit 15 calculates a rotation-speed difference between the engine rotation-speed Ne and the turbine rotation-speed Nt on the basis of the engine rotation-speed signal Ne and the turbine rotation-speed signal Nt. The brake switch 167 is disposed in the vicinity of a brake pedal and detecting an operation of a foot brake or side brake. When the brake is operated, the brake switch 167 outputs a brake operation signal B.

Next, the anti-creep control of the anti-creep control apparatus 10 of the first embodiment according to the present invention will be discussed hereinafter.

Figure 2:
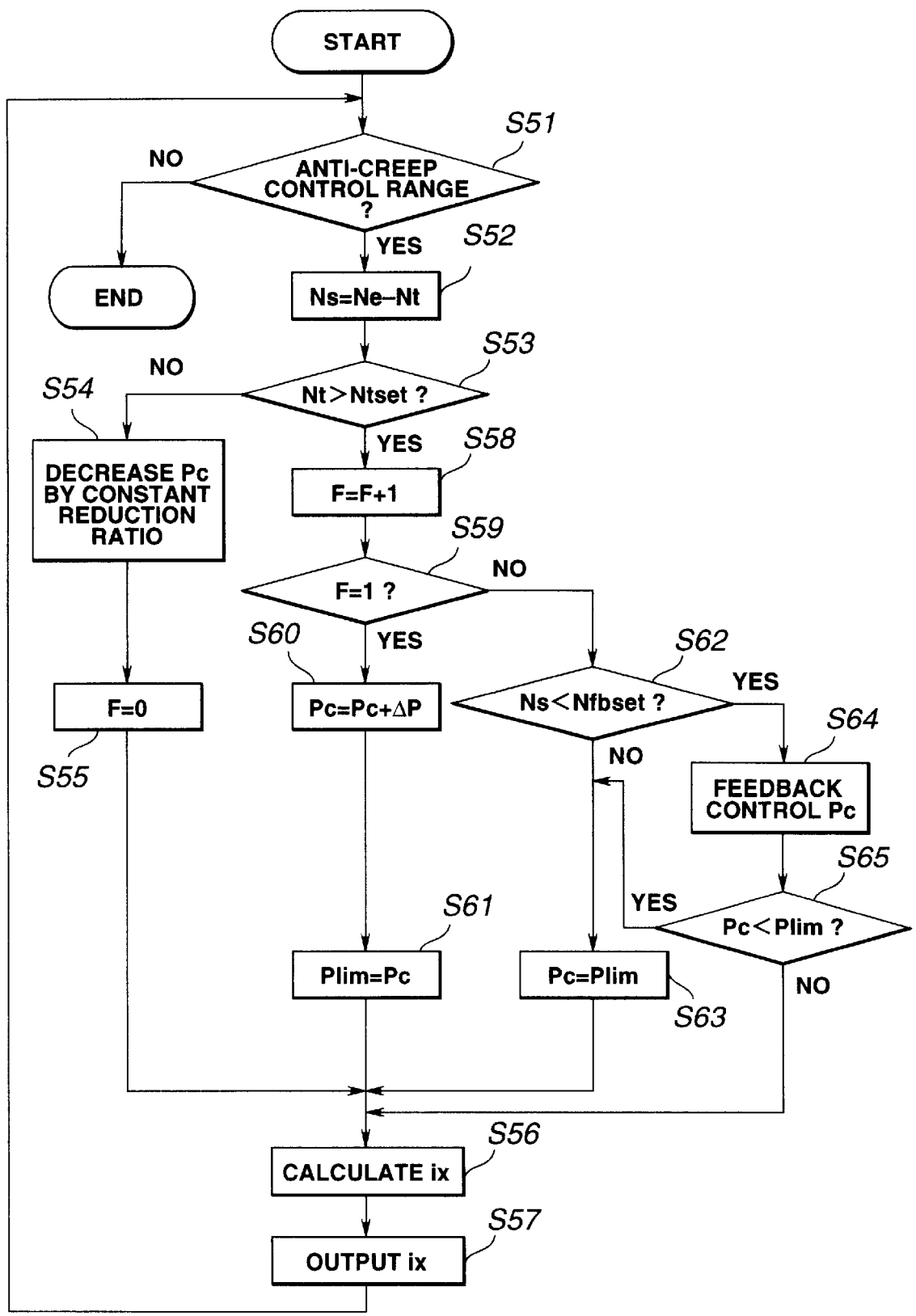
FIG. 2 is a flowchart which shows a control program of an anti-creep control executed by the anti-creep control apparatus of FIG. 1.
Figure 3:
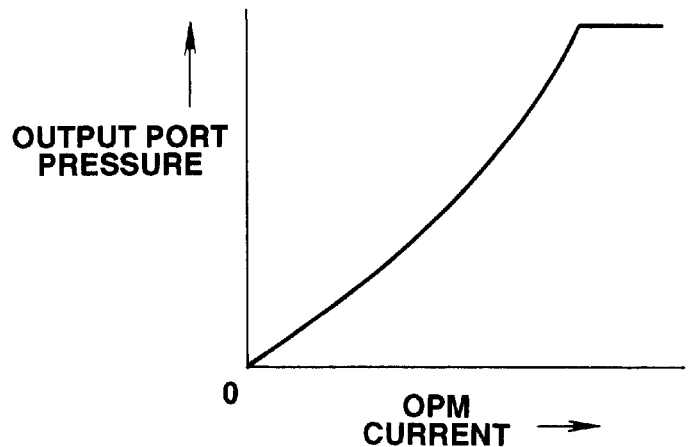
FIG. 3 is a graph which shows a relationship between an oil pressure modulator (OPM) electric current and an output port pressure which are adapted in the first embodiment.

FIG. 2 shows a flowchart indicative of a control program of a main routine of the anti-creep control.

At a step S51, the control unit 15 decides as to whether the vehicle is put in an anti-creep control range where the anti-creep control is to be executed, or not. More particularly, the control unit 15 decides as to whether the anti-creep executing condition including an idle condition, brake ON condition and zero speed condition are satisfied or not, in accordance with the signals $P_{SW}$, Id, No, and B from the corresponding sensors 161, 162, 164 and 167. When the decision at the step S51 is YES, the routine proceeds to a step S52. When the decision at the step S51 is NO, the routine goes to END to finish the anti-creep control program.

At the step S52, the control unit 15 calculates a rotation speed difference Ns between the engine rotation speed signal Ne and the turbine rotation speed signal Nt (Ns=Ne−Nt). The rotation speed difference Ns indicates an input and output rotation speed difference of the torque converter 11.

At a step S53, the control unit 15 decides as to whether the turbine rotation speed Nt is greater than a predetermined value Ntset or not. When the decision at the step S53 is NO (Nt≦Ntset), the routine proceeds to a step S54. When the decision at the step S53 is YES (Nt>Ntset), the routine proceeds to a step S58.

At the step S54, the control unit 15 controls the forward clutch command hydraulic pressure Pc so as to decrease it by a predetermined reduction ratio according to elapsed time.

Following to the execution of the step S54, the routine proceeds to a step S55 wherein the control unit 15 clears a flag F (F=0). Then, the routine proceeds to a step S56 wherein the control unit 15 calculates the OPM electric current ix.

Following to the execution of the step S56, at a step S57, the control unit 15 outputs the calculated OPM electric current ix to the OPM 13. After the execution of the step S57, the routine returns to the step S51.

During the execution of the step S52 the control unit 15 functions as a relative rotation detecting means, and during the execution of the step S57 the control unit 15 functions as a pressure control means.

When the forward clutch command hydraulic pressure Pc is gradually decreased by repeating a loop constituted by the YES decision at the step S51, the step S52, the NO decision at the step 53, the steps S54 to S57, and the step S51, the clutch transmission torque capacity is decreased and the relative rotation of the forward clutch 12 is generated. Since the first embodiment according to the present invention is arranged to execute the anti-creep control when the vehicle speed is zero (when the transmission output shaft is stopped), it is possible to detect the generation of the relative rotation of the forward clutch 12 from the turbine rotation speed Nt. Therefore, when Nt>Ntset, the control unit 15 decides that the relative rotation of the forward clutch 12 is generated. The predetermined value Ntset has been set at a value greater than a detection error generated by noises and the like during the turbine rotation stopped condition, in order to prevent the erroneous detection of the turbine rotation speed Nt.

When the decision at the step S53 is YES, that is, when the relative rotation of the forward clutch 12 is detected, the routine proceeds to the step S58 wherein the flag F is incremented by 1 (F=F+1) at the step S58.

Following to the execution of the step S58, the routine proceeds to a step S59 wherein the control unit 15 decides as to whether the flag F is 1 or not at the step S59. The control unit 15 decides at the step S59 that the flag F is 1 (F=1) only just after the decision at the step S53 becomes YES. When the decision at the step S59 is YES, the routine proceeds to a step S60 wherein the present command hydraulic pressure Pc is incremented by a predetermined increment ΔP (Pc=Pc+ΔP). Following to the execution of the step S60, the routine proceeds to a step S61 wherein the incremented present command hydraulic pressure Pc is set as a lower limit value Plim (Plim=Pc).

Following to the execution of the step S61, the routine proceeds to the step S56 wherein the control unit 15 calculates the OPM electric current ix.

Then, the routine proceeds to the step S57 wherein the control unit 15 outputs the calculated OPM electric current ix to the OPM. After the execution of the step S57, the routine returns to the step S51.

In the next control cycle, when the control routine proceeds in the order of the YES decision at the step S51, the step S52, the YES decision at the step S53, the step S58 and the step S59, the decision at the step S59 becomes NO since the flag F is greater than 1, and therefore the routine proceeds to a step S62.

At the step S62, the control unit 15 decides as to whether the rotation speed difference Ns of the torque converter 11 is smaller than a predetermined value Nfbset or not. When the decision at the step S62 is NO, the routine proceeds to a step S63 wherein the value Plim is set as the present command hydraulic pressure Pc (Pc=Plim). Following to the execution of the step S63, the routine proceeds to the step S56.

When the decision at the step S62 is YES, the routine proceeds to a step S64 wherein the control unit 15 executes a feedback control of the forward clutch command hydraulic pressure Pc so as to correspond the rotation speed difference Ns to a target rotation speed difference Nstgt. In this embodiment, the feedback control of the forward clutch command hydraulic pressure Pc, which is so-called IP control, is executed by calculating the command hydraulic pressure Pc by means of the following equation (1):

$$Pc = e \times Kp + \int e \times Ki \qquad (1)$$

wherein e is a deviation (Ns−Nstgt), and Kp and Ki are gains.

After the execution of the step S64, the routine proceeds to a step S65 wherein the control unit 15 decides as to whether the command hydraulic pressure Pc obtained at the step S64 is smaller than the value Plim or not. When the decision at the step S65 is NO (Pc≧Plim), the command hydraulic pressure Pc obtained at the step S64 is used as a present command hydraulic pressure, and the routine proceeds to a step S56. On the other hand, when the decision as the step S65 is YES (Pc<Plim), the routine proceeds to the step S63 wherein the value Plim is used as a present command hydraulic pressure Pc.

Next, the principle of the anti-creep control apparatus 10 according to the present invention will be discussed with reference to the characteristic view between the forward clutch hydraulic pressure and the piston stroke shown in FIG. 4.

Figure 4:
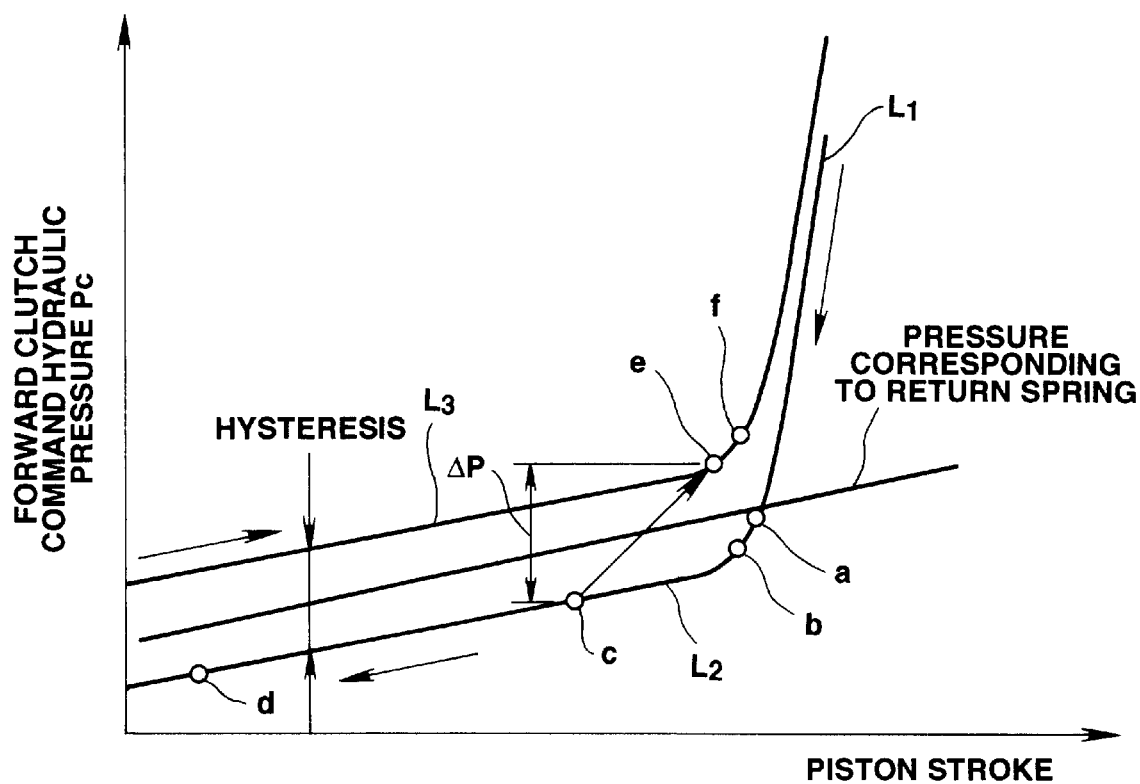
FIG. 4 is a graph showing a relationship between a forward clutch command hydraulic pressure and a piston stroke.

When the clutch command hydraulic pressure Pc is decreased at a rate of a predetermined gradient as shown by a line $L_1$ of a hydraulic pressure drain side of FIG. 4 at the time of the start of the anti-creep control, the relative rotation of the forward clutch 12 is statically generated at a point a in FIG. 4. At the point a, the piston stroke of the forward clutch 12 is slightly long as compared with the piston stroke during the anti-creep control corresponding to a point b. However, a time delay is generated between the lowering of the command hydraulic pressure Pc and the actual generation of the clutch relative rotation, and the detection delay is generated since the clutch relative rotation is detected from the change of the turbine rotation speed Nt. Therefore, the time moment that the actual clutch relative rotation is detected is at a point c on the line $L_2$ of the hydraulic pressure drain side. As a result, the forward clutch 12 is put in a condition that the piston stroke is largely returned from a so-called oil stay state that the hydraulic oil is filled to the stroke end.

In case that a conventional anti-creep apparatus is put in the above-mentioned condition, the input and output rotation speed difference of the torque converter 11 is greater than the target rotation speed difference Nstgt. Therefore, the clutch hydraulic pressure Pc is lowered to a point d of FIG. 4 by the execution of the above-mentioned anti-creep control. In order to decrease the loss stroke of the piston in this condition, it is necessary to execute a correction that largely increases the clutch command hydraulic pressure since the hysteresis is generated as shown in FIG. 4 because of the piston friction. If such correction is not executed, the engagement of the clutch cannot be executed in time in case of a quick start of the vehicle and therefore the engine racing is generated.

On the other hand, according to the present invention, the clutch command hydraulic pressure Pc is increased by the hydraulic pressure increment ΔP at the point c where the clutch relative rotation is detected by the increase of the turbine rotation speed Nt. Therefore, the piston of the forward clutch 12 is rapidly controlled so as to remove the loss stroke of the piston and to be moved from the point c of FIG. 4 to the point e on the line $L_3$ of the hydraulic pressure inlet side.

Figure 5:
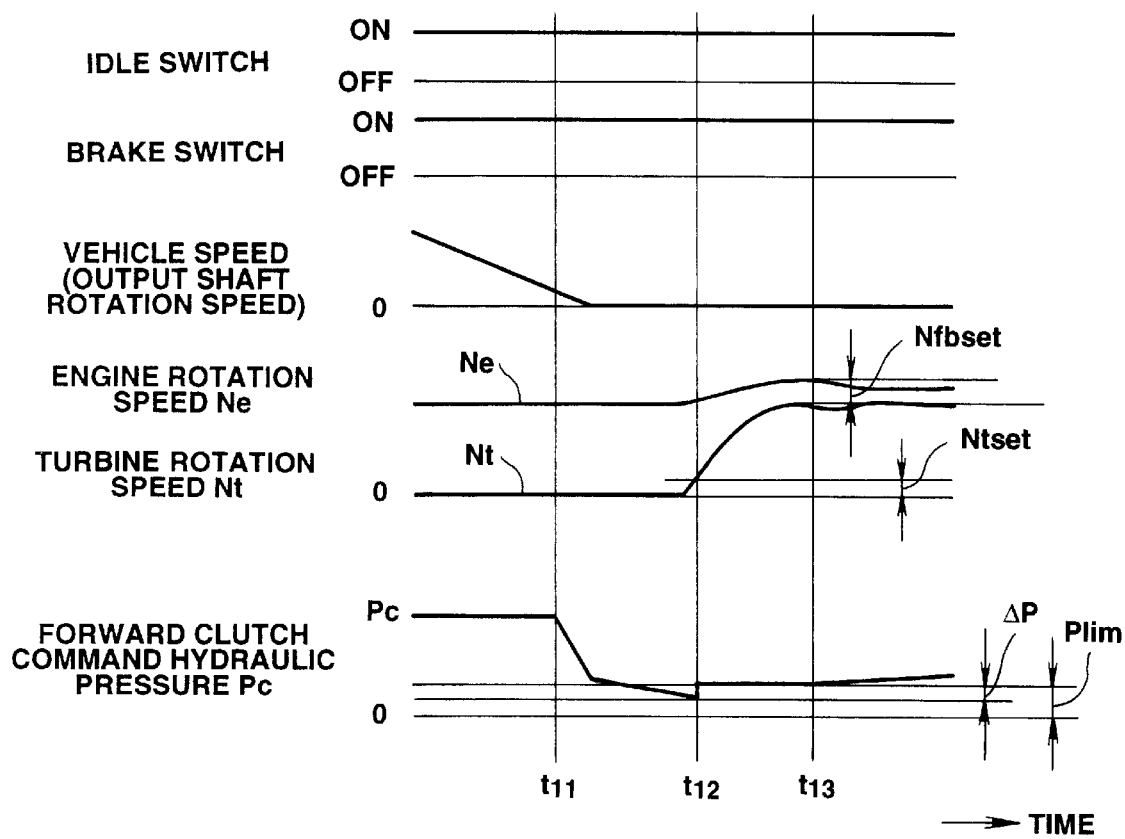
FIG. 5 is a time chart for explaining the manner of operation of the first embodiment.
Figure 6:
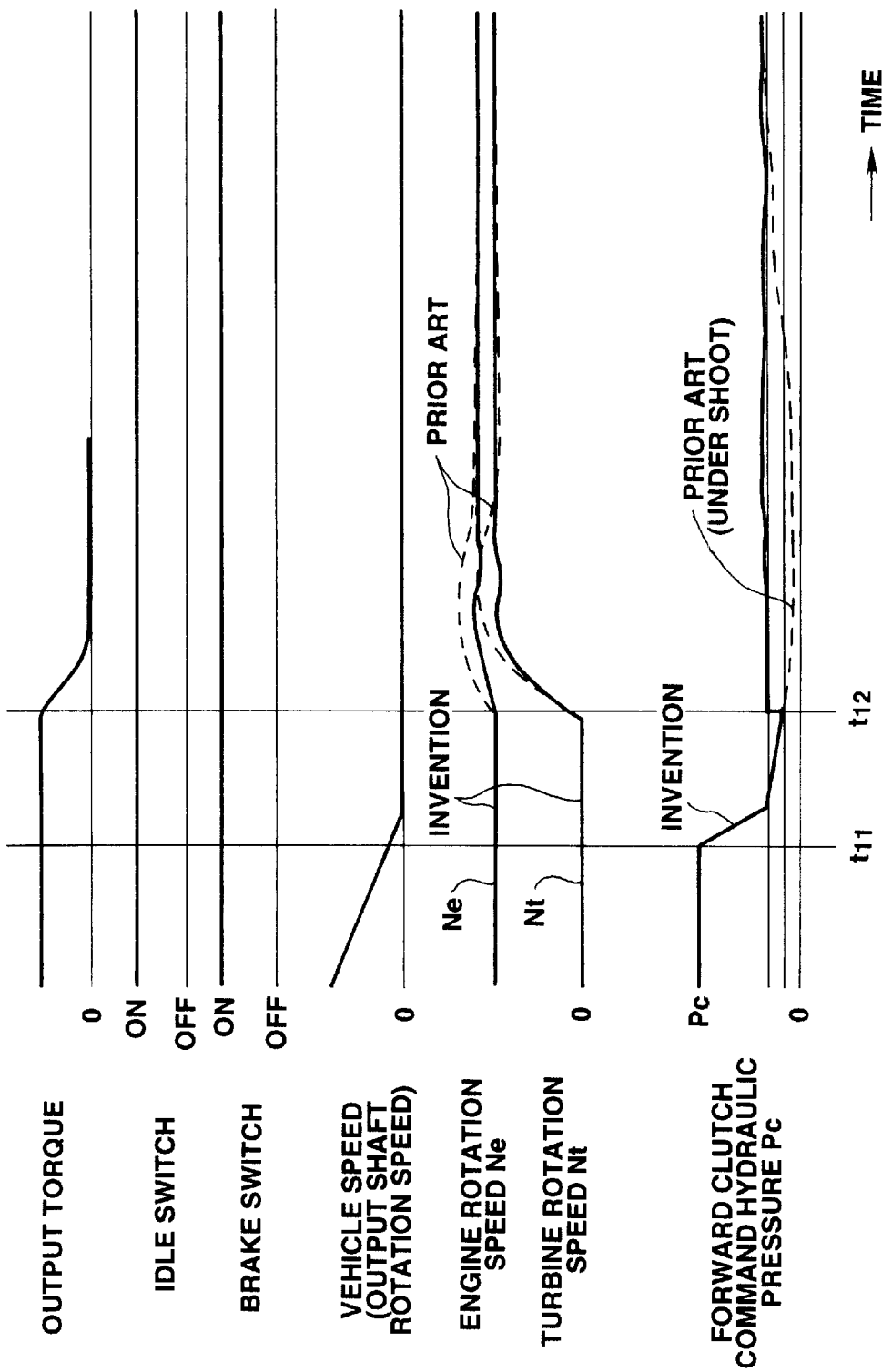
FIG. 6 is a time chart showing a comparison between the first embodiment and a prior art.

With reference to FIGS. 5 and 6, the manner of operation of the anti-creep control according to the present invention will be discussed.

At the time moment t11, the control unit 15 decides that the anti-creep control is started on the basis of the detection of the idle condition, the brake depressed condition, and the zero vehicle-speed condition, the step S54 of FIG. 2 is executed so as to decrease the command hydraulic pressure Pc with a predetermined reduction ratio according to the time elapse as shown in FIG. 5. Since the forward clutch 12 starts the relative rotation by the decrease of the clutch transmission torque according to the decrease of the command hydraulic pressure, the torque converter output shaft (turbine shaft) 22 starts rotating though the transmission output shaft 23 is stopped, and therefore the turbine rotation speed Nt is increased from zero.

The relative rotation of the forward clutch 12 is detected at the time moment t12 of FIG. 5 by the YES decision at the step S53. Then, the command hydraulic pressure Pc is set at the value Plim which is the sum of the just-before command hydraulic pressure Pc and the increment $\Delta P$. The value Plim is set as the lower limit value of the command hydraulic pressure Pc during the anti-creep control by the execution of the step S63 or S65 so as to prevent the clutch command hydraulic pressure from being excessively lowered. Therefore, the clutch piston of the forward clutch 12 is prevented from being stroked from the oil stay condition to the point d of FIG. 4. This ensures the clutch engagement responsibility of the forward clutch 12 in the quick start of the vehicle and prevents the racing of the engine.

In contrast, in case of the conventional anti-creep control apparatus, even if the relative rotation of the forward clutch 12 is detected at the time moment t12 and the feedback control of the command hydraulic pressure of the torque converter is executed as is the same as that in the present invention, the time period necessary for reaching the forward clutch command hydraulic pressure Pc to the desired value becomes long as compared with the time period necessary to the apparatus of the present invention, as shown by a dotted line of FIG. 6. Therefore, the engagement responsibility in the quick start of the vehicle cannot be ensured. If the feedback gain is increased to solve the above problem, the hunting is generated.

At the time moment t13 of FIG. 5 when the rotation speed difference Ns=Ne−Nt becomes smaller than the predetermined value Nfbset by the increase of the turbine rotation speed Nt due to the setting of the command hydraulic pressure to Plim after the time moment t12, the feedback control, by which the command hydraulic pressure Pc is controlled by means of PI control such that the rotation speed difference Ns of the torque converter is corresponded to the target torque converter rotation speed difference Nstgt, is started by the execution of the step S64. If the obtained command hydraulic pressure Pc is greater than or equal to the value Plim, the obtained command hydraulic pressure Pc is used as it is. If it is smaller than the value Plim, the value Plim is used as the command hydraulic pressure. Therefore, even if the feedback control goes unstable by this control, the excessive decrease of the clutch command hydraulic pressure is prevented, and the sufficient engagement responsibility of the forward clutch 12 is ensured. In case that during the feedback control the idle switch is turned OFF by the quick start of the vehicle, the forward clutch 12 is promptly engaged and the racing of the engine is prevented.

With the thus arranged anti-creep control apparatus 10 according to the present invention, hydraulic pressure of the forward clutch 12 is controlled such that the engagement responsibility of the forward clutch 12 is maintained so as to respond to the quick start of the vehicle. Therefore, it becomes possible to prevent the racing of the engine during the quick start of the vehicle and to prevent the shock due to the radical engagement in the racing due to the delay of the engagement. Further, the degradation of the clutch durability due to the engine racing is improved.

Figure 7:
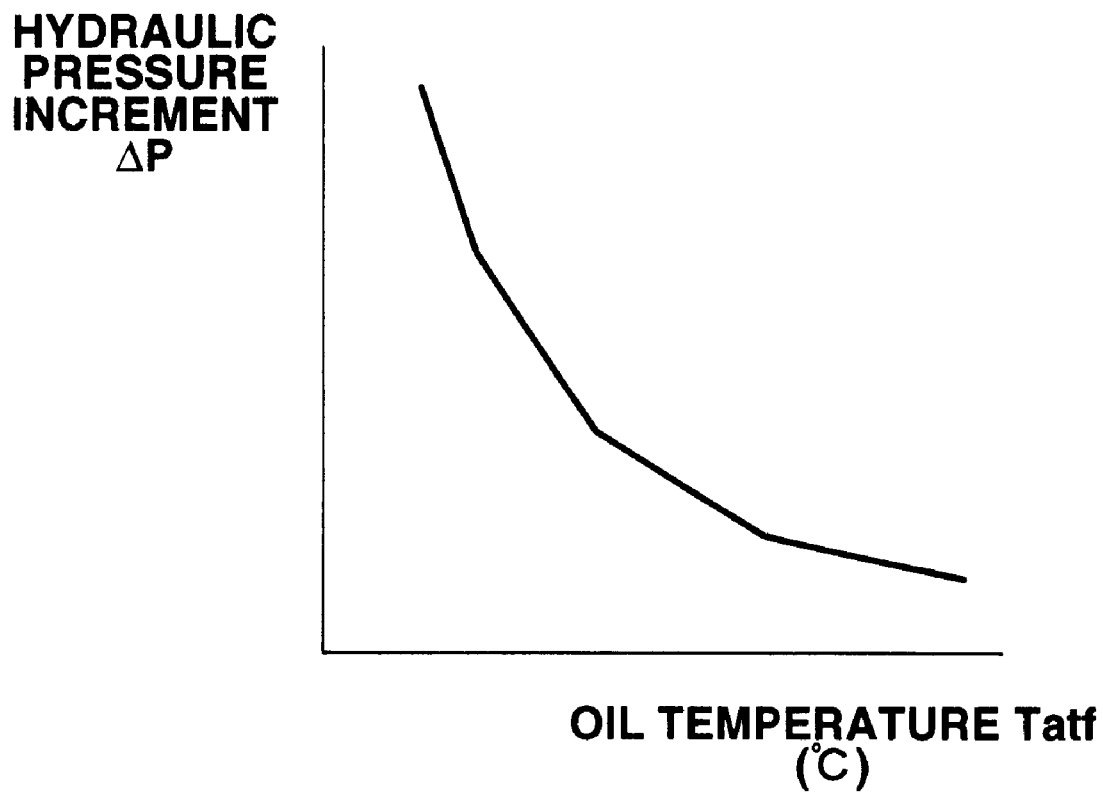
FIG. 7 is a graph showing a relationship between an oil temperature and an increment of the hydraulic pressure used in the anti-creep control of a second embodiment.

Referring to FIG. 7, there is shown a map of a forward clutch command hydraulic pressure increment applied to the anti-creep control of the anti-creep control apparatus 10 of a second embodiment according to the present invention. The second embodiment is the same as the first embodiment except that the hydraulic pressure increment $\Delta P$ of the forward clutch command hydraulic pressure is variable according to the oil temperature. The hard ware of the second embodiment is as same as that of the first embodiment shown in FIG. 1.

As shown in FIG. 7, the hydraulic pressure increment $\Delta P$ is increased according to the decrease of the oil temperature $T_{atf}$ of the automatic transmission. The hydraulic pressure increment $\Delta P$ corresponds to the friction of the seal portion of the forward clutch 12. The hydraulic pressure increment $\Delta P$ of the forward clutch command hydraulic pressure Pc at the time of the detection of the forward clutch relative rotation is determined. Although the second embodiment has been shown and described to use the map showing a relationship between the oil temperature and the hydraulic pressure increment, it will be understood that a function representative of the relationship between the oil temperature and the hydraulic pressure increment.

With the thus arranged second embodiment, it becomes possible to correct the change of the hysteresis caused by the change of the friction of the clutch seal portion according to the change of the oil temperature. This decreases the shock due to the radical clutch engagement even in case that the clutch hydraulic pressure is increased too large under the high oil temperature condition. Further, this prevents the degrading of the clutch engagement responsibility caused by the shortage of the clutch hydraulic pressure under the low oil temperature condition.

Figure 8:
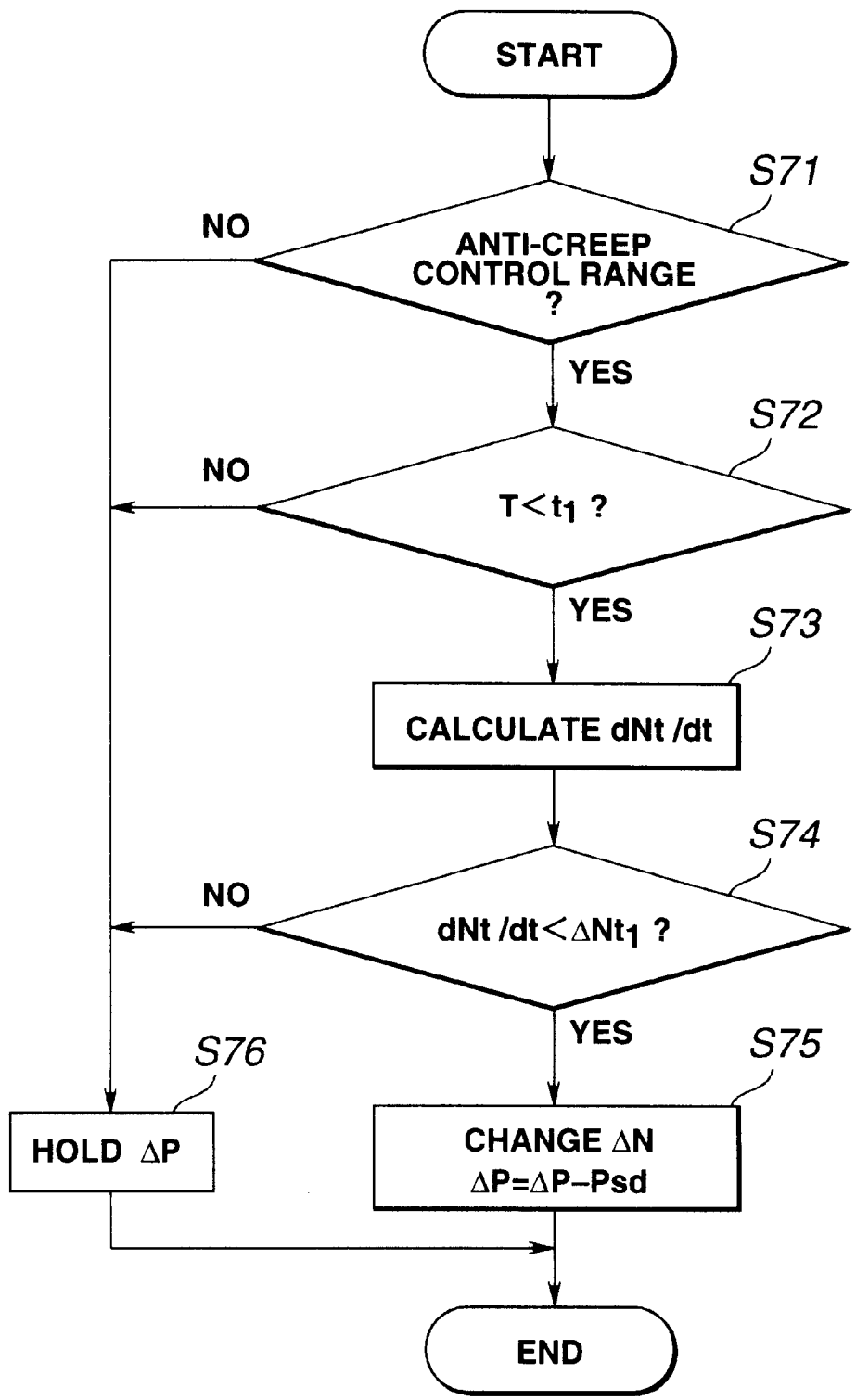
FIG. 8 is a flowchart showing a learning control program for the forward clutch hydraulic pressure increment used in the anti-creep control of a third embodiment.

Referring to FIG. 8, there is shown a flowchart of a learning control of the forward clutch command hydraulic pressure increment applied to the anti-creep control of a third embodiment according to the present invention. The hard ware of the third embodiment is the same as that of the first embodiment shown in FIG. 1. The control program is further modified in this embodiment as follows.

At a step S71, the control unit 15 decides as to whether the vehicle is put in the anti-creep control range or not, as similar to the step S51 of the first embodiment. When the decision at the step S71 is YES, the routine proceeds to a step S72. When the decision at the step S71 is NO, the routine proceeds to a step S76 wherein the hydraulic pressure increment $\Delta P$ is held.

When the anti-creep control is executed, at the step S72 the control unit 15 decides as to whether a counted value T of a timer for counting an elapsed time period from the relative rotation detection time of the forward clutch 12 reaches a learning period t1 or not. When the counted value T of the timer is smaller than the learning time t1 (T<t1), the routine proceeds to a step S73 wherein the control unit 15 calculates a change ratio dNt/dt of the turbine rotation speed which corresponds to a change ratio of the forward clutch relative rotation. When the counted value T of the timer becomes greater than or equal to the learning time (T≧t1), the routine proceeds to a step S76 wherein the hydraulic pressure increment ΔP is hold.

Following to the execution of the step S73, the routine proceeds to a step S74 wherein the control unit 15 decides as to whether the turbine rotation change ratio dNt/dt is smaller than a predetermined value ≧Nt1 or not. When the decision at the step S74 is YES (dNt/dt<ΔNt1), the routine proceeds to a step S75. When the decision at the step S74 is NO (dNt/dt≧ΔNt1), the routine proceeds to the step S76.

At the step S75, the control unit 15 decreases the hydraulic pressure increment ΔP by the predetermined value Psd (ΔP=ΔP−Psd). The correction of the hydraulic pressure increment ΔP is only once executed even if the decision at the step S74 becomes YES several times during the learning time period t1 under the anti-creep control. The obtained increment ΔP at the step S75 is used in the next anti-creep control. Since the hydraulic pressure increment since ΔP is in turn decreased, the initial value of the hydraulic pressure increment ΔP becomes an upper limit value. Therefore, an initial value of the hydraulic pressure increment ΔP is set at a relatively large value taking account of the deviation of the hysteresis characteristic.

The manner of operation of the third embodiment of the anti-creep control apparatus 10 according to the present invention will be discussed by the comparison of the third embodiment with the first embodiment.

In the anti-creep control of the first embodiment, when the relative rotation of the forward clutch 12 is detected, the clutch command hydraulic pressure Pc is incremented by ΔP. This increment ΔP is set so as to be an optimum value according to the magnitude of the hysteresis of the characteristic between the clutch hydraulic pressure and the clutch piston stroke. The friction of the clutch piston seal portion is a forceful factor with respect to the hysteresis. Therefore, in case that the hysteresis is small due to the deviation in individuals, the preset increment ΔP becomes large and functions to generate an engagement shock by the radical generation of large torque. Further, since the increment ΔP becomes the lower limit value of the hydraulic pressure command value during the anti-creep control, the clutch relative rotation tends not to increase and functions to prevent the anti-creep control.

In contrast, according to the third embodiment, when the turbine rotation change ratio dNt/dt corresponding to the relative rotation change ratio becomes smaller than the predetermined value ΔNt1 at least once, the control unit 15 decides that the increment ΔP at the relative rotation detection time is too large and may generate the radical engagement of the forward clutch 12. Therefore, the increment ΔP is decreased by the predetermined value Psd, and the decreased increment is used in the next anti-creep control. This prevents the generation of the shock caused by the frictional deviation of the seal portion of the clutch piston among individuals.

Although the third embodiment has been shown and described such that the decision logic for deciding as to whether the learning control of the increment ΔP is executed is based on the decision of dNt/dt<ΔNt1, it will be understood that the other decision logic for detecting that the forward clutch hydraulic pressure Pc during the anti-creep control is stablly kept, for example, a logic that the turbine rotation speed Nt during the learning time period t1 is put in a narrow range, may be applied to this embodiment. Of course, instead of the turbine rotation change ratio, a corresponding other physical quantity may be used. Further, in order to adapt to the aging change of the anti-creep control apparatus 10, it may be arranged to increment the increment ΔP by a microscopic amount if the condition of dNt/dt<ΔNt is not satisfied in each anti-creep control. In such a case, in order to prevent the generation of the shock due to the unstableness of the increment ΔP, the predetermined value for increasing the increment ΔP is set to be sufficiently small as compared with the predetermined value Psd for decreasing the increment ΔP.

Figure 9:
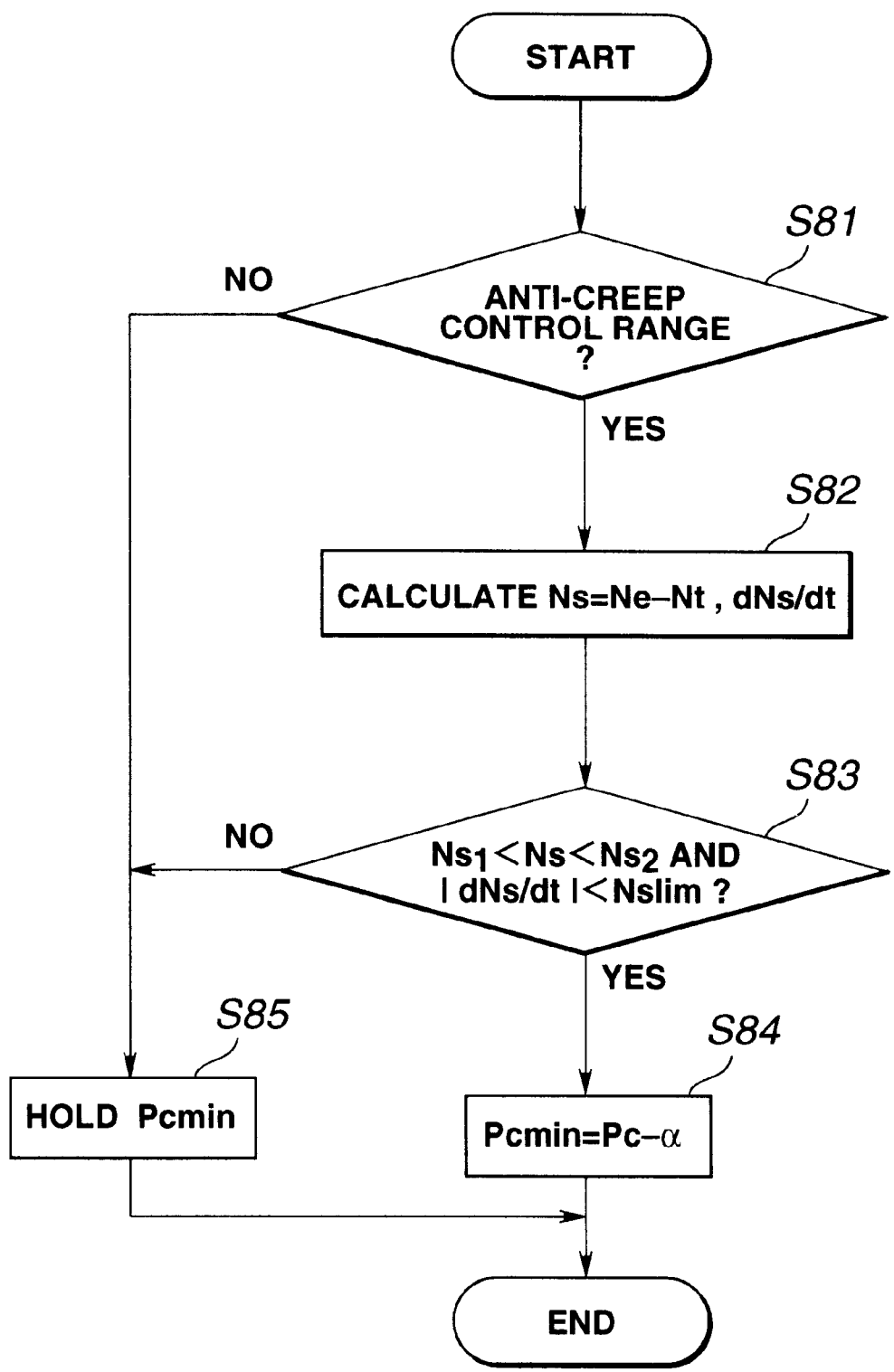
FIG. 9 is a flowchart showing a learning control program for the forward clutch hydraulic pressure increment used in the anti-creep control of a fourth embodiment.

Referring to FIG. 9, there is shown a flowchart of a learning control of the forward clutch command hydraulic pressure increment applied to the anti-creep control of a fourth embodiment according to the present invention. The hardware of the fourth embodiment is as same as that of the first embodiment shown in FIG. 1.

At a step S81, the control unit 15 decides as to whether the vehicle is put in the anti-creep control range or not, as similar to the step S71 of the third embodiment. When the decision at the step S81 is YES, the routine proceeds to a step S82. When the decision at the step S81 is NO, the routine proceeds to a step S85 wherein the control unit 15 holds a value Pcmin.

When the anti-creep control is executed, at the step S82 the control unit 15 calculates the input and output rotation speed difference Ns=Ne−Nt of the torque converter 11 and a differential dNss/dt thereof.

At a step S83, the control unit 15 decides as to whether both conditions of Ns1<Ns<Ns2 and |dNs/dt|<Nslim are satisfied or not. When the decision at the step S83 is NO, the routing proceeds to the step S85. When the decision at the step S83 is YES, that is, when the input and output rotation speed difference Ns is ranging from Ns1 to Ns2 between which the target rotation difference Nstgt is located and when the absolute value of the change ratio dNs/dt is smaller than a predetermined value Nslim, the routine proceeds to a step S84.

At the step S84, the control unit 15 sets a value obtained by subtracting a predetermined value α from the present hydraulic pressure Pc as Pcmin (Pcmin=Pc−α). The determined value Pcmin at the step S84 or S85 is used in a control program of FIG. 10 executed in the next anti-creep control.

Figure 10:
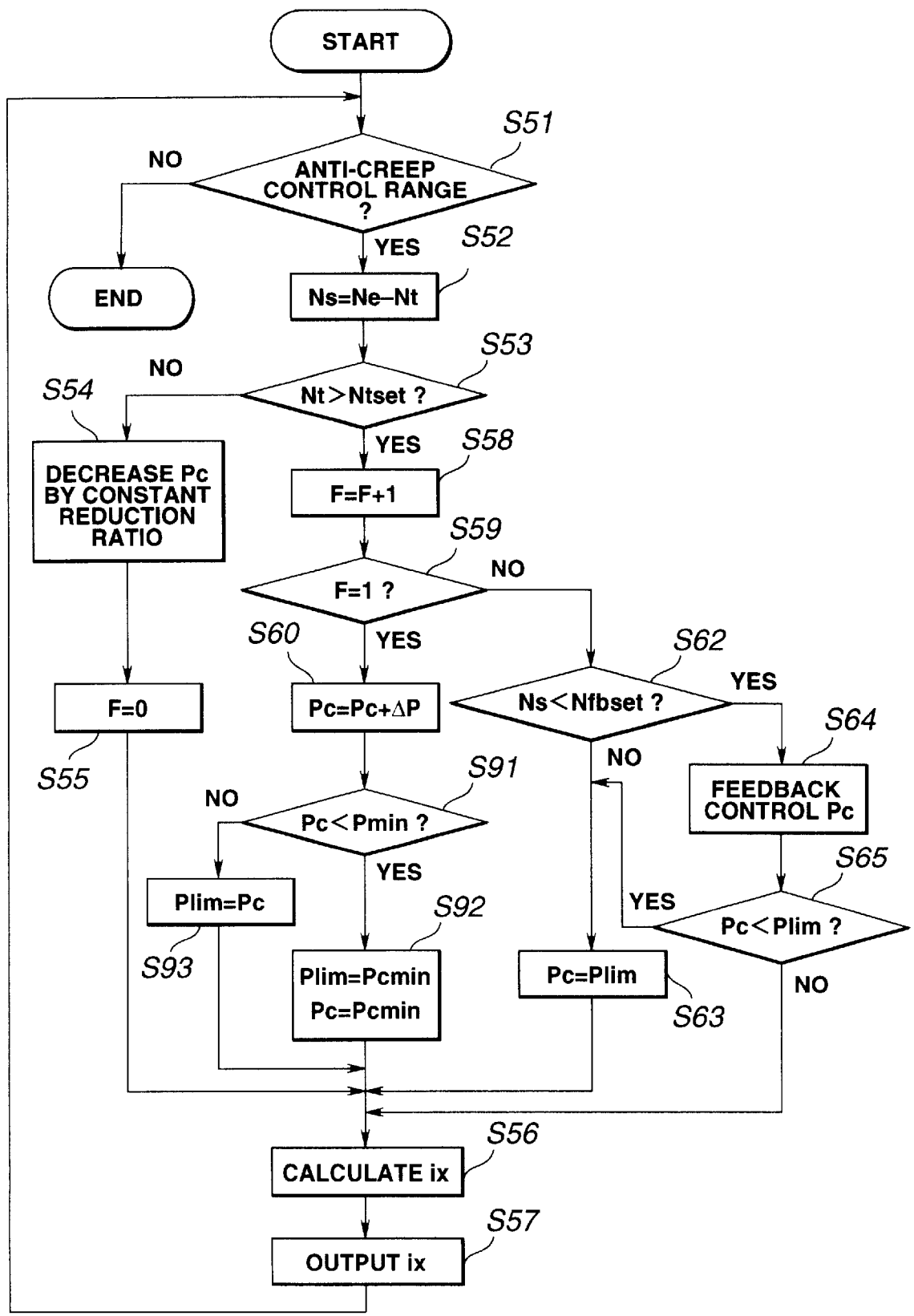
FIG. 10 is a flowchart showing a main routine of the anti-creep control program of the automatic transmission for the fourth embodiment.

FIG. 10 shows a flowchart of a main routine program of the anti-creep control of the automatic transmission of the fourth embodiment according to the present invention. This control program of FIG. 10 is generally similar to that of FIG. 2 of the first embodiment except that the result of the learning control of the command hydraulic pressure increment of FIG. 9 is reflected in this control program. Only the different part from that of the first embodiment will be discussed hereinafter.

In FIG. 10, after the execution of the step S60, the routine proceeds to a step S91 wherein the control unit 15 decides as to whether the present command hydraulic pressure Pc is smaller than the value Pcmin obtained in the control program of FIG. 9. When the decision at the step S91 is YES (Pc<Pcmin), the routine proceeds to a step S92 wherein Plim=Pcmin and Pc=Pcmin are set. When the decision at the step S91 is NO (Pc≧Pcmin), the routine proceeds to a step S93 wherein Plim=Pc is set.

The manner of operation of the fourth embodiment will be discussed hereinafter.

When the anti-creep control is stable by the feedback control, the command hydraulic pressure Pc is settled into a generally constant value. Since the turbine rotation speed Nt is not increased without the draining the hydraulic pressure in the transition to the anti-creep control, it is necessary to execute the feedback control of the torque converter input and output rotation speed difference Ns so that the once drained hydraulic pressure is increased at the target torque converter rotation difference Nstgt. Therefore, the learning control is executed at the hydraulic pressure increasing side of the hysteresis characteristic of FIG. 4, and the command hydraulic pressure Pc is generally settled at the point f on the line L3 in FIG. 4.

With the thus arranged fourth embodiment, by the execution of the step S83 of FIG. 9, the control unit 15 detects that the forward clutch command hydraulic pressure Pc during the anti-creep control is settled at the stable value when the torque converter input and output rotation speed difference Ns is in the range from Ns1 to Ns2 and when the absolute value of the change ratio dNs/dt of the difference Ns is smaller than the predetermined value Nslim. When the both conditions inquired in the step S83 are satisfied, by the execution of the step S84, the value Pcmin is determined into a value obtained by subtracting α from the command hydraulic pressure Pc corresponding to the point f of FIG. 4. Further, by the execution of the step S85, the value Pcmin at the finish of the present anti-creep control is stored so as to be used in the next anti-creep control.

In the next anti-creep control, the stored Pcmin is compared with the command hydraulic pressrue Pc=Pc+ΔP by the execution of the step S91 of FIG. 10. When Pc<Pcmin, the step S92 is executed such that Plim=Pcmin and Pc=Pcmin. When Pc≧Pcmin, the step S93 is executed such that Plim=Pc. Accordingly, Pcmin becomes the lower limit value of the command hydraulic pressure Pc at the time that the increment ΔP is increased in the next anti-creep control. This enables to prevent the degradation of the clutch engagement responsibility which is caused by the excessive lowering of the clutch command hydraulic pressure generative in the large friction of the clutch piston seal portion due to the deviations among individuals. Further, this enables to prevent the engine racing and the clutch engagement shock by the quick start during the anti-creep control.

Of course, it will be understood that this fourth embodiment may be combined with the third embodiment. In such a case, a further significant advantage is ensured.

Although the fourth embodiment has been shown and described such that the decision logic for deciding as to whether the learning control of the increment ΔP is executed is based on the decision of Ns1<Ns<Ns1 and |dNs/dt|<Nslim, it will be understood that the other decision logic for detecting that the forward clutch hydraulic pressure Pc during the anti-creep control is settled at a stable value. Of course, instead of the turbine rotation difference Ns and the change ratio dNs/dt thereof, other corresponding physical quantities may be used.

Figure 11:
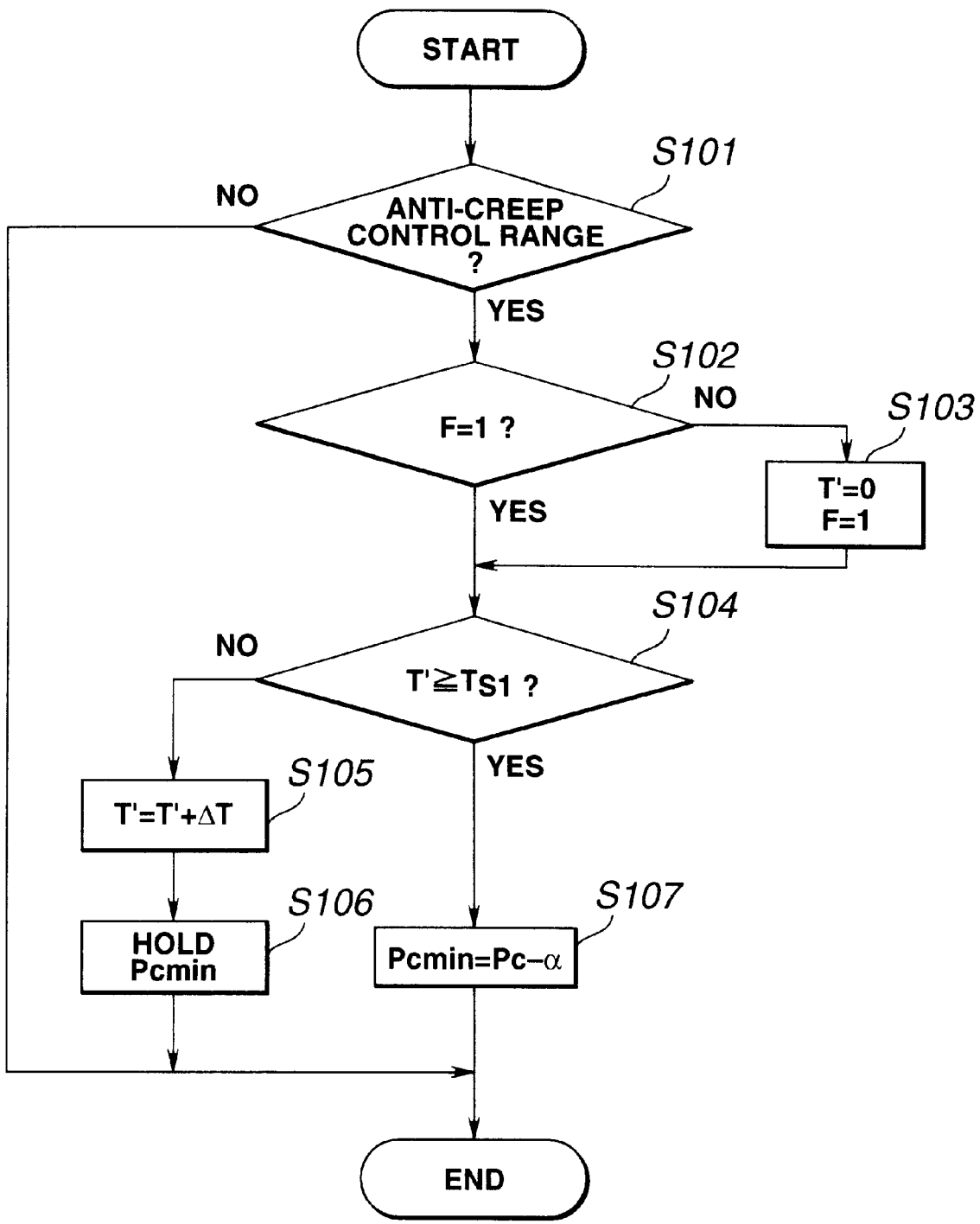
FIG. 11 is a flowchart showing a learning control program for the forward clutch hydraulic pressure increment used in the anti-creep control of a fifth embodiment.

Referring to FIG. 11, there is shown a flowchart of a learning control of the forward clutch command hydraulic pressure increment applied to the anti-creep control of a fifth embodiment according to the present invention. The hard ware of the fifth embodiment is as same as that of the first embodiment shown in FIG. 1.

At a step S101, the control unit 15 decides as to whether the vehicle is put in the anti-creep control range or not, as similar to the step S71 of the third embodiment. When the decision at the step S101 is YES, the routine proceeds to a step S102. When the decision at the step S101 is NO, the routine proceeds to an end.

During the anti-creep control, at the step S102 the control unit 15 decides as to whether the flag F is 1 or not. When the decision at the step S102 is NO (F≠1), the routine proceeds to a step S103 wherein a timer counter value T' is reset (T=0) and the flag F is set at 1 (F=1). Then, the routine proceeds to a step S104. When the decision at the step S102 is YES (F=1), the routine proceeds to the step S104.

At the step S104, the control unit 15 decides as to whether the timer counter value T' is greater than or equal to a predetermined value Ts1 or not. The predetermined value Ts1 has been determined as a time period necessary for settling the command hydraulic pressure Pc at a stable value, such as the relative rotation speed Ns is settled in the predetermined range. When the decision at the step S104 is NO (T'<Ts1), the routine proceeds to a step S105 wherein the timer count T' is incremented by Δt (T'=T'+Δt). After the execution of the step S105, the routine proceeds to a step S106 wherein the value Pcmin is held and then the routine goes to the end. When the decision at the step S104 is YES (T'≧Ts1), the routine proceeds to a step S107 wherein the value obtained by subtracting the predetermined value α from the present command hydraulic pressure Pc is set as Pcmin. The determined Pcmin at the step S106 or S107 is used in the control program of FIG. 10 in the anti-creep control.

Figure 12:
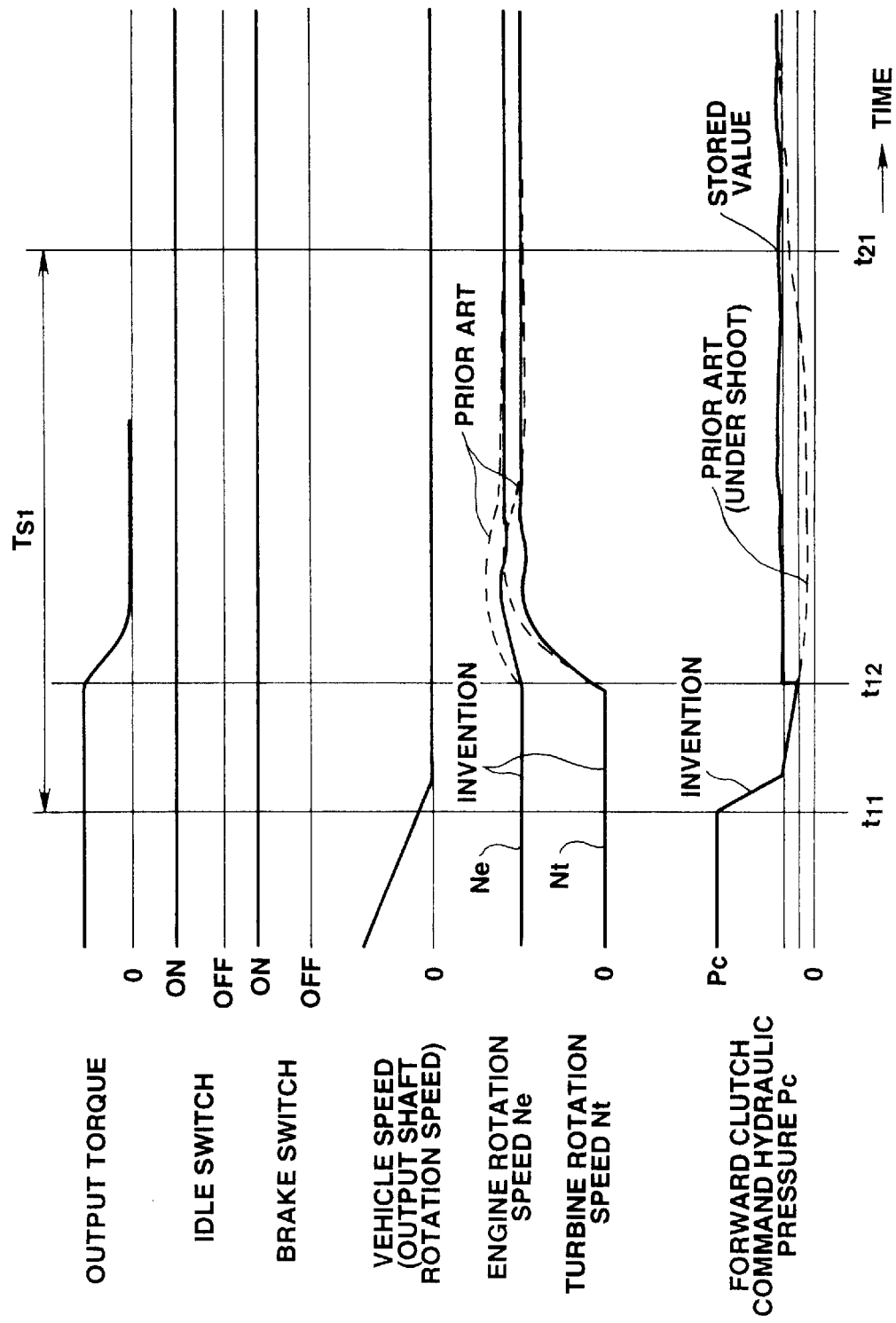
FIG. 12 is a time chart for explaining the manner of operation of the fifth embodiment.

With thus arranged fifth embodiment, since the learning control of the increment of the forward clutch command hydraulic pressure is executed at the time moment t21 (a predetermined time Ts1 elapsed from the time moment t11) on the basis of the previously stored forward clutch hydraulic pressure Pc as shown by a time chart of FIG. 12, the advantages gained by the fourth embodiment are similarly ensured.

The decision time that the anti-creep control may be defined, for example, the time that the control unit 15 decides that Nt>0, or the time that the control unit 15 decides that Ne–Nt is smaller than a predetermined value, or the time that the control unit 15 decides that forward clutch command hydraulic pressure is smaller than a predetermined.

Figure 13:
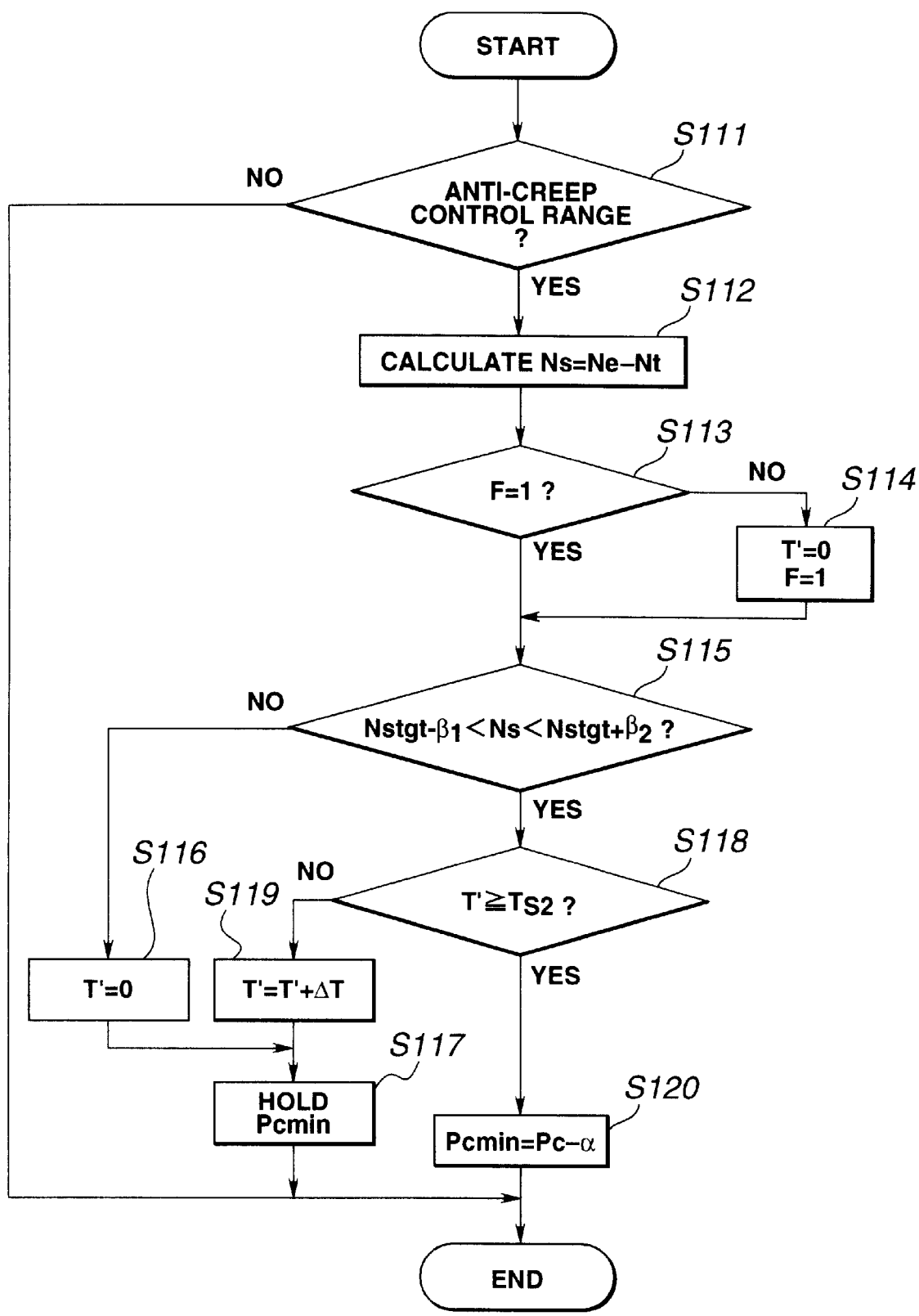
FIG. 13 is a flowchart showing a learning control program for the forward clutch hydraulic pressure increment used in the anti-creep control of a sixth embodiment.

Referring to FIG. 13, there is shown a flowchart of a learning control of the forward clutch command hydraulic pressure increment applied to the anti-creep control of a sixth embodiment according to the present invention. The hard ware of the sixth embodiment is as same as that of the first embodiment shown in FIG. 1.

At a step S111, the control unit 15 decides as to whether the vehicle is put in the anti-creep control range or not, as similar to the step S71 of the third embodiment. When the decision at the step S111 is YES, the routine proceeds to a step S112. When the decision at the step S111 is NO, the routine proceeds to an end.

During the anti-creep control, at the step S112 the control unit 15 calculates the input and output rotation speed difference Ns=Ne–Nt of the torque converter 11.

At the step S113, the control unit 15 decides as to whether the flag F is 1 or not. When the decision at the step S113 is NO (F≠1), the routine proceeds to a step S114 wehrein a timer counter value T' is reset (T=0) and the flag F is set at 1 (F=1). When the decision at the step S113 is YES (F=1), the routine proceeds to a step S115. After the execution of the step S114, the routine proceeds to the step S115.

At the step S115, the control unit 15 decides as to whether Nstgt–β1<Ns<Bstgt+β2. The value β1 may be a value as same as the value β2. When the decision at the step S115 is NO, the routine proceeds to a step S116 wherein the count value T' is reset (T=0). Then, the routine proceeds to a step S117 wherein Pcmin is held. When the decision at the step S115 is YES, the routine proceeds to a step S118.

At the step S118, the control unit 15 decides as to whether the timer count value T' becomes greater than or equal to the predetermined value Ts2 or not. When the decision at the step S118 is NO (T'<Ts2), the routine proceeds to a step S119 wherein the timer count value T' is incremented by Δt (T'=T'+Δt). After the execution of the step S119, the routine proceeds to the step S117. When the decision at the step S118 is YES (T≧Ts2), the routine proceeds to a step S120 wherein the value obtained by subtracting the predetermined value α from the present command hydraulic pressure Pc is set as Pcmin. The determined Pcmin at the step S117 or S120 is used in the control program of FIG. 10 in the anti-creep control.

With thus arranged sixth embodiment, as shown in FIG. 14, in case that a predetermined time period Ts2 elapsed from the time moment t11 while keeping the condition that the torque converter input and output rotation speed difference Ns is within the range from a value obtained by subtracting a predetermined value β1 from the target difference Nstgt and a value obtained by adding the predetermined value β2 to the target difference Nstgt, the learning control of the increment of the forward clutch command hydraulic pressure is by the execution of the step S115 of FIG. 12 on the basis of the previously stored forward clutch hydraulic pressure Pc. Therefore, the advantages gained by the fourth embodiment are similarly ensured by this embodiment.

The entire disclosure of Japanese Patent Application No. 8-194639 filed on Jul. 24, 1996 including specification, claims, drawings and summary are incorporated herein by reference in its entirety.

What is claimed is:

1. An anti-creep control apparatus of an automatic transmission, the automatic transmission including a torque converter connected to an engine and a friction element operating during a drive range of the automatic transmission, said anti-creep control apparatus comprising:

a relative rotation detecting means for detecting a generation of the relative rotation of the friction element; and a pressure control means for increasing a friction element command hydraulic pressure at the time of the generation of the relative rotation by a predetermined value including zero, the increased friction element command hydraulic pressure being set as a lower limit value of the friction element command hydraulic pressure during a present anti-creep control.

2. An anti-creep control apparatus as claimed in claim 1, wherein the predetermined value for increasing the friction element command hydraulic pressure at the time of the generation of the relative rotation is determined on the basis of an oil temperature.

3. An anti-creep control apparatus as claimed in claimed in claim 1, wherein the anti-creep control is executed during a condition that a vehicle equipped with the anti-creep apparatus is stopped while an engine is operating and that the automatic transmission is set in a drive range, in a manner of a slippage of the friction element.

4. An anti-creep control apparatus of an automatic transmission comprising:

a torque converter connected to an engine;

a friction element operating during a drive range of the automatic transmission;

an oil pressure modulator adjusting hydraulic pressure supplied to said friction element;

a sensor unit detecting an engine output, an engine rotation speed and an output shaft rotation speed of said torque converter; and a control unit deciding a generation of the relative rotation of said friction element on the basis of the signals from said sensor unit, said control unit controlling said oil pressure modulator so as to increase the hydraulic pressure to be applied to said friction element by a predetermined value when said control unit decides that the relative rotation of said friction element is generated, wherein said control unit decides that the relative rotation is generated when the output shaft rotation speed is greater than a preset value.

5. An anti-creep control apparatus as claimed in claim 4, wherein said sensor unit further includes an oil temperature sensor for detecting a temperature of oil of the automatic transmission, said control unit determining the predetermined value for increasing the hydraulic pressure of said friction element on the basis of an oil temperature detected by the oil temperature sensor.

* * * * *